United States Patent
Haeussler et al.

(10) Patent No.: US 11,767,870 B2
(45) Date of Patent: Sep. 26, 2023

(54) EXPANSION ANCHOR WITH DIFFERENT EXPANSION ANGLES

(71) Applicant: Hilti Aktiengesellschaft, Schaan (LI)

(72) Inventors: Karl Haeussler, Lunden (CH); Hideki Shimahara, Grabs (CH); Mareike Frensemeier, Buchs (CH); Yijun Li, Buchs (CH); Wentao Yan, Buchs (CH); Arturo Guevara Arriola, Irving, TX (US)

(73) Assignee: Hilti Aktiengesellschaft, Schaan (LI)

( * ) Notice: Subject to any disclaimer, the term of this patent is extended or adjusted under 35 U.S.C. 154(b) by 482 days.

(21) Appl. No.: 16/976,965

(22) PCT Filed: Feb. 26, 2019

(86) PCT No.: PCT/EP2019/054706
§ 371 (c)(1),
(2) Date: Aug. 31, 2020

(87) PCT Pub. No.: WO2019/170470
PCT Pub. Date: Sep. 12, 2019

(65) Prior Publication Data
US 2021/0372450 A1    Dec. 2, 2021

(30) Foreign Application Priority Data
Mar. 5, 2018    (EP) .................................... 18159867

(51) Int. Cl.
*F16B 13/06*    (2006.01)

(52) U.S. Cl.
CPC ............ *F16B 13/065* (2013.01); *F16B 13/06* (2013.01)

(58) Field of Classification Search
CPC ........ F16B 2/00; F16B 13/002; F16B 13/004; F16B 13/04; F16B 13/065; F16B 13/0858;
(Continued)

(56) References Cited

U.S. PATENT DOCUMENTS

| 4,501,520 A | * | 2/1985 | Bergner | ............... F16B 13/0891 411/21 |
| 2008/0075553 A1 | * | 3/2008 | Gonzalez Carquijero | ................... F16B 13/0858 411/82.1 |

(Continued)

FOREIGN PATENT DOCUMENTS

| CH | 688 061 A5 | 4/1997 |
| DE | 2 256 822 A1 | 6/1974 |

(Continued)

OTHER PUBLICATIONS

PCT/EP2019/054706, International Search Report dated May 17, 2019 (Two (2) pages).

*Primary Examiner* — Roberta S Delisle
(74) *Attorney, Agent, or Firm* — Crowell & Moring LLP

(57) ABSTRACT

An expansion anchor includes an anchor bolt and an expansion sleeve which surrounds the anchor bolt. The expansion sleeve has an expansion tongue and an anchor tongue and the anchor bolt has a backward-pointing expansion slope for radially displacing the expansion tongue and a backward-pointing anchor slope for radially displacing the anchor tongue. The backward-pointing anchor slope extends more steeply than the backward-pointing expansion slope at least in some regions.

14 Claims, 2 Drawing Sheets

(58) Field of Classification Search
CPC ...... F16B 13/12; F16B 13/122; F16B 13/124; F16B 13/128; F16B 19/1081; F16B 19/109; F16B 13/06
USPC .................... 411/15, 21–22, 44, 45, 48, 80.5
See application file for complete search history.

(56) References Cited

U.S. PATENT DOCUMENTS

| | | | |
|---|---|---|---|
| 2009/0142156 A1* | 6/2009 | Pisoni | F16B 13/066 411/55 |
| 2016/0238052 A1* | 8/2016 | Schaeffer | F16B 13/065 |
| 2016/0312812 A1* | 10/2016 | Dijkhuis | F16B 13/065 |
| 2017/0058932 A1* | 3/2017 | Cousineau | F16B 13/003 |
| 2018/0073537 A1* | 3/2018 | Gstach | F16B 13/065 |
| 2019/0145451 A1* | 5/2019 | Linka | F16B 13/065 411/44 |
| 2020/0224695 A1* | 7/2020 | Steinberg | F16B 13/065 |
| 2021/0003160 A1* | 1/2021 | Haeussler | F16B 13/063 |
| 2021/0062844 A1* | 3/2021 | Frensemeier | F16B 13/065 |
| 2021/0231150 A1* | 7/2021 | Shimahara | F16B 13/065 |

FOREIGN PATENT DOCUMENTS

| | | |
|---|---|---|
| DE | 27 01 510 A1 | 7/1978 |
| EP | 0 019 782 A2 | 12/1980 |
| EP | 2 309 138 A2 | 4/2011 |
| EP | 2 848 825 A1 | 3/2015 |
| JP | 9-209457 A | 8/1997 |
| JP | 2007-154914 A | 6/2007 |
| WO | WO 2012/126700 A1 | 9/2012 |
| WO | WO 2015/067578 A1 | 5/2015 |

* cited by examiner

EXPANSION ANCHOR WITH DIFFERENT EXPANSION ANGLES

CROSS REFERENCE TO RELATED APPLICATIONS

This application claims the priority of International Application No. PCT/EP2019/054706, filed Feb. 26, 2019, and European Patent Document No. 18159867.3, filed Mar. 5, 2018, the disclosures of which are expressly incorporated by reference herein.

BACKGROUND AND SUMMARY OF THE INVENTION

The invention relates to an expansion anchor. An expansion anchor of this kind is provided with an anchor bolt and an expansion sleeve which surrounds the anchor bolt.

WO15067578 A1 discloses an expansion anchor in the expansion body of which furrows are introduced which are closed toward the front and which reduce the contact surface between the expansion body and the expansion sleeve.

EP2848825 A1 describes an expansion anchor of which the expansion sleeve has axially extending projections that protrude inward. When the expansion sleeve expands, the projections reach the expansion region of the expansion anchor in some regions and are pushed radially outward by the expansion region.

Expansion anchors which have an anti-rotation means between the expansion sleeve and the anchor bolt are disclosed in DE2256822 A1. The anti-rotation means can be formed, for example, by an edge-side fold of the expansion sleeve, which engages in a groove in the anchor bolt.

WO12126700 A1 describes an expansion anchor of which the expansion body has axially extending projections in one end region, EP2309138 A2 describes an expansion anchor of which the expansion body has corners in cross section.

The problem addressed by the invention is that of providing an expansion anchor which is particularly efficient and is particularly versatile, and can be produced at a particularly low cost.

An expansion anchor according to the invention is characterized in that the expansion sleeve has an expansion tongue and an anchor tongue, and in that the anchor bolt has a backward-pointing expansion slope for radially displacing the expansion tongue and a backward-pointing anchor slope for radially displacing the anchor tongue, the anchor slope extending more steeply than the expansion slope at least in some regions.

A basic concept of the invention can be considered to be that of providing different tongues on the expansion sleeve, which tongues are expanded with different expansion angles when the expansion anchor is mounted.

The invention is based on the knowledge that, in conventional expansion anchors, the interplay between external friction—i.e., the friction between the expansion sleeve and the borehole wall—and internal friction—i.e., the friction between the expansion sleeve and the anchor bolt—can, under certain circumstances, limit the freedom in dimensioning, in particular the freedom in the choice of expansion angles, which in turn can limit the efficiency of the expansion anchors. For example, in certain substrate configurations, for example in cracked concrete, large expansion angles are desirable, in particular in order to enable effective subsequent expansion when the crack opens even with a slight offset of the anchor bolt. However, if the expansion angle is increased, the internal friction increases and can possibly become greater than the external friction. The resulting expansion anchor would then have a tendency to pull out of the borehole without adequate anchoring of the expansion sleeve in the early phase of mounting.

This is where the invention comes in and provides different tongues, which are associated with differently inclined slopes. In particular, at least one expansion tongue with an associated expansion slope having a comparatively flat angle and at least one anchor tongue with an associated anchor slope having a comparatively steep angle are provided. For example, the expansion tongue can make it possible for the expansion anchor to be initially secured in the substrate, and the anchor tongue can allow reinforced expansion, with a large angle, after the crack has opened. This means that large angles can also be made available for anchoring in cracked concrete without unduly increasing the internal friction in the early phase of the anchoring process, i.e., without causing a tendency to pull out prematurely. This makes it possible to provide angles on the anchor tongue that go beyond the usual dimensions. The associated greater expansion can lead to particularly good anchoring of the sleeve in the concrete after the crack has opened. However, the integration according to the invention of tongues that expand to different extents on the same anchor can result in an increase in performance in other areas of application as well, since the differences in the expansion properties provide an additional structural degree of freedom that allows the expansion anchor to adapt particularly well to the prevailing boundary conditions. According to the invention, this is possible at a particularly low production cost, inter alia because the different tongues are all parts of the expansion sleeve.

The expansion sleeve preferably forms an open ring, that is to say a C-shape, in which the anchor bolt is received, which enables simple production by winding a blank around the anchor bolt. The anchor bolt can radially displace the two tongues by means of their slopes when the anchor bolt is shifted axially backward relative to the expansion sleeve. In particular, the expansion slope is used for the radial displacement of the expansion tongue when the expansion slope is shifted axially backward relative to the expansion tongue and the anchor slope is used for the radial displacement of the anchor tongue when the anchor slope is shifted axially backward relative to the anchor tongue. The expansion slope can radially displace the expansion tongue when the anchor bolt together with the expansion slope is shifted backward relative to the expansion tongue, and the anchor slope can radially displace the anchor tongue when the anchor bolt together with the anchor slope is shifted backward relative to the anchor tongue.

The expansion slope is in particular arranged, at least in some regions, in front of the expansion tongue. The anchor slope is in particular arranged, at least in some regions, in front of the anchor tongue. Preferably, the expansion sleeve and the anchor bolt can be arranged coaxially. The two slopes both point backward, in particular with respect to the longitudinal axis of the anchor bolt, which can in particular include that the anchor bolt has a free space behind each of the two slopes. In particular, both the expansion slope and the anchor slope approach the longitudinal axis of the anchor bolt toward the rear.

Insofar as the axial direction, the circumferential direction and the radial direction are mentioned here, this is intended to refer in particular to the longitudinal axis of the anchor bolt, which can in particular coincide with the longitudinal axis of the expansion anchor. The different angles of inclination are also intended to relate in particular to the longitudinal axis of the anchor bolt. The longitudinal axis of the anchor bolt extends in particular in the mounting direction, i.e., in the direction in which the anchor bolt is inserted into a borehole when it is mounted as intended. The direction indications "front" and "back" or "rear" are to be used here uniformly, especially insofar as these direction indications are used in connection with the anchor bolt and the expansion sleeve. In particular, the direction indications are intended to relate to the axial direction.

The anchor slope being arranged "more steeply" compared to the expansion slope at least in some regions is to be understood in particular to mean that the anchor slope, at least in some regions, has a larger acute angle of inclination with respect to the longitudinal axis of the anchor bolt than the expansion slope, measured in particular in a radial plane containing the longitudinal axis of the anchor bolt. "More steeply" is therefore intended to include in particular "more steeply with respect to the longitudinal axis."

In particular, the anchor slope can have a maximum angle of inclination with the longitudinal axis which is in the range of from 36° to 70°. This enables particularly good anchoring. The expansion slope can, for example, have a maximum angle of inclination with the longitudinal axis of approximately 30°.

The anchor bolt can also have a multi-part design and have, for example, an anchor rod and an expansion body screwed to the anchor rod, on which body at least the expansion slope is arranged in particular. However, it is particularly preferred for the anchor bolt to be formed in one piece. The expansion sleeve and/or the anchor bolt, in particular its expansion body, preferably consist of a metal material at least in some regions. In particular, the expansion slope and the anchor slope are arranged in a tension-resistant manner on the anchor bolt, so that tensile forces directed backward can be transmitted from the anchor bolt to the tongues via these slopes.

The anchor bolt can have a load application structure in a rear region of the anchor bolt. The load application structure is used to introduce tensile forces into the anchor bolt. The load application structure may be an external thread or an internal thread, for example. In another embodiment, the load application structure can also be a head that forms a maximum cross section.

Unless stated otherwise, the features described here are intended to apply in particular to a non-mounted expansion anchor, i.e., an expansion anchor before mounting, and or to a state in which the tongues have not yet been expanded by the corresponding slopes and/or to a state in which the expansion tongue is arranged so as to be shifted axially backward relative to the expansion slope at least in regions, and/or in which the anchor tongue is arranged so as to be shifted axially backward relative to the anchor slope at least in regions.

It is particularly preferred that, when the expansion tongue is axially displaced toward the expansion slope, the expansion tongue runs onto the expansion slope before the anchor tongue runs onto the anchor slope. In other words, the effective distance of the expansion tongue from the expansion slope is smaller than the effective distance of the anchor tongue from the anchor slope, such that the expansion tongue is activated, i.e., radially displaced, by the anchor bolt before the anchor tongue. This means that the internal friction at the start of the mounting process can be kept particularly low, which can counteract any undesired early pulling-out of the expansion anchor in a particularly efficient manner.

The anchor slope preferably completely covers the free end of the anchor tongue with regard to the circumferential direction of the anchor bolt. In other words, the angular range spanned by the anchor slope around the longitudinal axis of the anchor bolt is equal to or greater than the angular range spanned by the free end of the anchor tongue around the longitudinal axis of the anchor bolt, and the angular range spanned by the free end of the anchor tongue around the longitudinal axis of the anchor bolt is within the angular range spanned by the anchor bolt around the longitudinal axis of the anchor bolt. As a result, the anchor tongue can be activated particularly effectively.

Another preferred embodiment of the invention involves the anchor slope being formed on a cavity arranged in the anchor bolt. This cavity extends radially into the anchor bolt. A wall delimiting the cavity, in particular a wall delimiting the cavity at the front, can form the anchor slope. This embodiment allows an expansion anchor according to the invention to be produced particularly simply. The cavity can receive the anchor tongue, in particular before activation of the anchor tongue, at least in regions, in particular in a position that is shifted radially toward the longitudinal axis of the anchor bolt. This makes it particularly easy to avoid undesirable interactions of the anchor tongue, in particular with the surrounding substrate, so that the structural freedom and thus the potential field of application can be even greater. The cavity can be arranged, for example, in the neck region or in the expansion body of the anchor bolt.

The expansion tongue and the anchor tongue can point in the same direction, in particular either both forward or both backward. This is intended to include in particular that either the free end of the expansion tongue is arranged at the front of the expansion tongue and the free end of the anchor tongue is arranged at the front of the anchor tongue, or the free end of the expansion tongue is arranged at the back of the expansion tongue and the free end of the anchor tongue is arranged at the back of the anchor tongue. In particular, the bending direction of the two tongues during radial displacement can thus be the same. Among other things, this can be advantageous with respect to the flow of force and/or can further reduce the production cost.

It is particularly preferred for both the expansion tongue and the anchor tongue to point forward, which can in particular include that the free end of the expansion tongue is arranged at the front of the expansion tongue and the free end of the anchor tongue is arranged at the front of the anchor tongue. In particular, the expansion tongue points toward the expansion slope and the anchor tongue points toward the anchor slope. This can be advantageous with regard to the expansion behavior.

Both the expansion tongue and the anchor tongue preferably protrude from the front of the expansion sleeve. In particular, the free end of the expansion tongue and the free end of the anchor tongue form at least a portion of the front end face of the expansion sleeve. The production cost can be particularly low in such an embodiment, in particular because both the expansion tongue and the anchor tongue can be formed by slits which extend axially backward into the expansion sleeve from the end face of the expansion sleeve. In addition, if both the expansion tongue and the anchor tongue are arranged at the front, a particularly deep load introduction into the borehole is made possible, which can be advantageous with regard to the load values. In particular, an embodiment can be provided in which the expansion tongue and the anchor tongue are arranged next to one another in the circumferential direction around the longitudinal axis.

The expansion tongue and the anchor tongue can end with their free ends at the same axial height, that is to say the free ends of the two tongues can lie axially next to one another. This can have advantages in terms of production. However, it can be particularly preferred for the expansion tongue and the anchor tongue to protrude forward to different extents. In particular, the anchor tongue can reach further forward than the expansion tongue. This allows the behavior of the expansion anchor to be adapted even better to its surroundings in a structurally particularly simple manner.

According to another expedient embodiment of the invention, the expansion tongue and the anchor tongue point in opposite directions, in particular one to the front and the other to the back. Accordingly, the bending direction of the two tongues during radial displacement can differ, which allows the bending behavior to be adapted particularly well to the function of the relevant tongue. In addition, an arrangement of the tongues in which they point in opposite directions allows, in a structurally particularly simple manner, the tongues to be axially shifted and to be provided with particularly—in the circumferential direction—wide free ends, which can further improve the anchoring.

It is particularly preferred for the expansion tongue to point forward and the anchor tongue to point backward. In a particularly simple manner, this can enable particularly good adaptation to the different steepness of the associated slopes.

The anchor tongue is preferably embedded in the expansion tongue at least in regions. In particular, the anchor tongue can be embedded in the expansion tongue on at least two sides, in particular on one of its long sides and on its rear side. Among other things, this can enable a particularly compact design and particularly deep load introduction in the borehole. The anchor tongue is preferably arranged between two expansion tongues.

In particular, the anchor tongue can be embedded all around in the expansion tongue. In particular, the expansion tongue can thus surround the anchor tongue, that is to say the anchor tongue can be embedded in the expansion tongue on its front side, on its rear side and on its two longitudinal sides. On the one hand, this allows particularly deep load introduction in the borehole, and on the other hand, the free end of the expansion tongue can be designed to particularly—in the circumferential direction—wide, which can further improve the anchoring.

It may also be the case that the expansion tongue is arranged on the front end face of the expansion sleeve and the anchor tongue is arranged on the rear end face of the expansion sleeve or vice versa.

The anchor slope and the expansion slope may overlap axially. For example, both the anchor slope and the expansion slope can be provided on an expansion body, in particular an expansion cone, of the anchor bolt. Among other things, this can have production advantages and ensure particularly concentrated load introduction, especially deep in the borehole.

The anchor slope and the expansion slope may also be arranged so as to be axially shifted with respect to one another. For example, the expansion slope can be provided on an expansion body, in particular an expansion cone, of the anchor bolt, and the anchor slope can be provided on a neck region of the anchor bolt. This makes it possible to provide particularly—in the circumferential direction—wide slopes in a particularly simple manner, which can be advantageous with regard to the load values.

The anchor bolt expediently has an expansion body, with the expansion slope being formed on the expansion body. The expansion body can preferably be integral with the rest of the anchor bolt, in particular integral with an anchor rod of the anchor bolt. In principle, the expansion body could also be designed separately from the anchor rod, but then coupled to the anchor rod in a tension-resistant manner. In particular, the expansion body can be designed as an expansion cone. Such an expansion cone can have a mathematically exactly conical surface, but it does not have to.

A further preferred embodiment of the invention is that the anchor tongue forms a claw at its free end, which is preferably curved radially outward. Such a claw can in particular be understood to mean a curved structure which protrudes radially outward. By means of such a claw, the external friction can be increased even further in a manner that is particularly simple in terms of production, and/or further improved anchoring in the borehole can be ensured, in particular after the crack has opened.

The expansion sleeve may also have a plurality of expansion tongues, with each of the expansion tongues being associated with a backward-pointing expansion slope arranged on the anchor bolt for radially displacing the relevant expansion tongue. This can be advantageous with regard to a particularly homogeneous introduction of force into the surrounding borehole wall, the avoidance of voltage peaks and, thus, particularly good load values. The individual expansion slopes can be separated from one another, for example by cavities in the anchor bolt, in particular by cavities with anchor slopes. The individual expansion slopes can, however, also merge seamlessly into one another and form a common expansion slope.

Additionally or alternatively, the anchor sleeve may have a plurality of anchor tongues, with each of the anchor tongues being associated with a rearward-pointing anchor slope arranged on the anchor bolt for radially displacing the relevant anchor tongue. This can be advantageous with regard to a particularly homogeneous introduction of force into the surrounding borehole wall, the avoidance of voltage peaks and, thus, particularly good load values. The individual anchor slopes can be formed in particular on cavities in the anchor bolt.

If a plurality of expansion tongues and/or a plurality of expansion slopes are provided, these can in particular be designed as described here in connection with an expansion tongue or expansion slope. If a plurality of anchor tongues and/or a plurality of anchor slopes are provided, these can in particular be designed as described here in connection with an anchor tongue or an anchor slope. In particular, it is possible for the anchor slopes to extend more steeply than the expansion slopes at least in some regions.

The invention also relates to the intended use of an expansion anchor according to the invention. In particular, the invention relates to the use of an expansion anchor according to the invention in which the anchor bolt is displaced, in particular displaced backward, relative to the expansion sleeve, which is in particular arranged in a borehole, and in the process the expansion tongue is radially displaced by the expansion slope, and the anchor tongue is radially displaced by the anchor slope.

Features which are explained in connection with the expansion anchor according to the invention can also be used in the use according to the invention, and, conversely, features which are explained in connection with the use according to the invention can also be used in the expansion anchor according to the invention.

The invention is explained in greater detail in the following with reference to preferred embodiments, which are shown schematically in the accompanying drawings, it being possible to implement individual features of the embodiments shown in the following in principle individually or in any desired combination within the context of the invention.

DETAILED DESCRIPTION OF THE DRAWINGS

Figure 1:
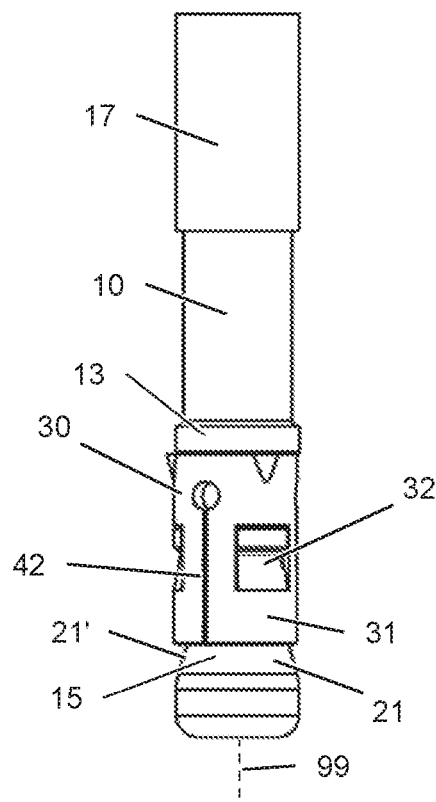
FIG. 1 is a side view of a first embodiment of an expansion anchor according to the invention.
Figure 2:
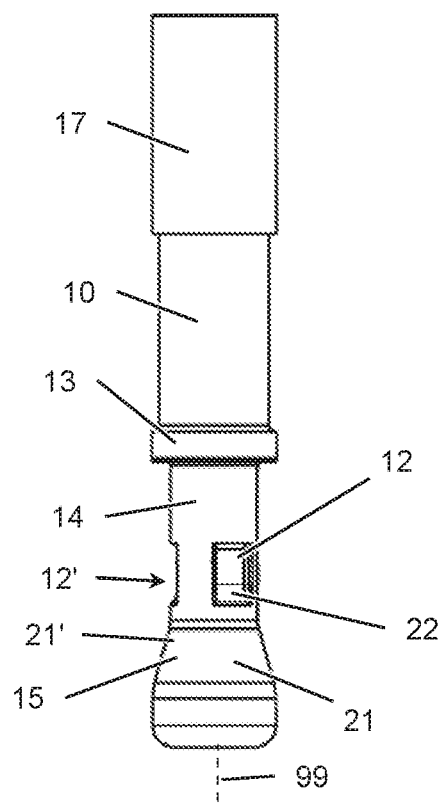
FIG. 2 is a side view of the anchor bolt of the expansion anchor from FIG. 1 without an expansion sleeve.

FIGS. 1 to 4 show a first embodiment of an expansion anchor according to the invention. The expansion anchor has an anchor bolt 10 having a longitudinal axis 99, and an expansion sleeve 30, the expansion sleeve 30 annularly surrounding the anchor bolt 10. The anchor bolt 10 has a neck region 14 having an at least approximately constant cross section. Adjoining the neck region 14, the anchor bolt 10 has an expansion body 15 for the expansion sleeve 30 in front of the neck region 14, in the front end region of the anchor bolt 10, which expansion body is integral with the rest of the anchor bolt 10 here by way of example. On the expansion body 15, the anchor bolt 10 widens on its outer surface toward the front starting from the neck region 14, i.e., the expansion body 15 converges toward the rear on its outer side. The expansion sleeve 30 surrounds the neck region 14 of the anchor bolt 10. The expansion body 15 is largely arranged in front of the expansion sleeve 30.

The anchor bolt 10 also has a sleeve stop 13, for example in the form of a circular ring, which limits an axial movement of the expansion sleeve 30 toward the rear end of the anchor bolt 10, i.e., an axial movement of the expansion sleeve 30 away from the expansion body 15.

At its rear end region opposite the expansion body 15, the anchor bolt 10 has a load application structure 17, shown here, for example, as an external thread, for introducing tensile forces into the anchor bolt 10. A nut (not shown) with a corresponding internal thread can be arranged on this external thread.

Figure 3:
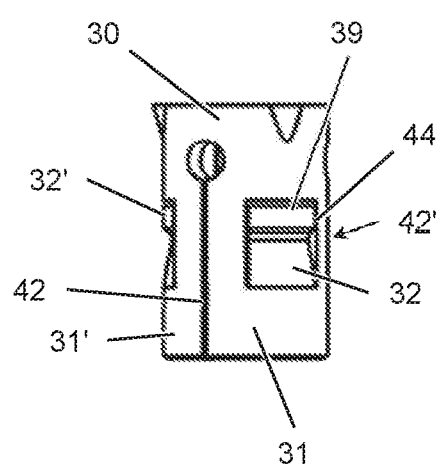
FIG. 3 is a side view of the expansion sleeve of the expansion anchor from FIG. 1.
Figure 4:
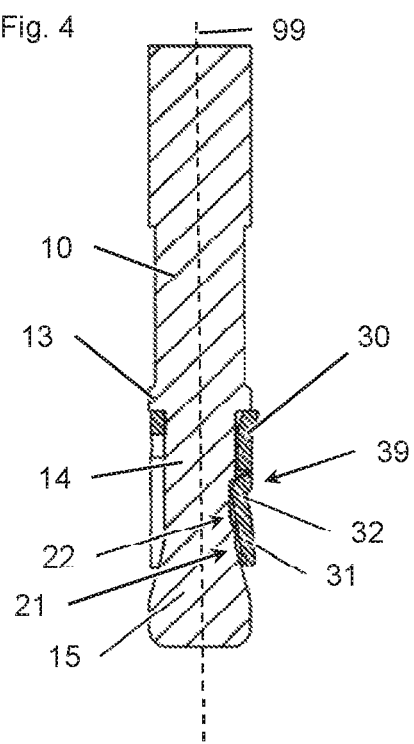
FIG. 4 is a longitudinal sectional view of the expansion anchor from FIG. 1.
Figure 5:
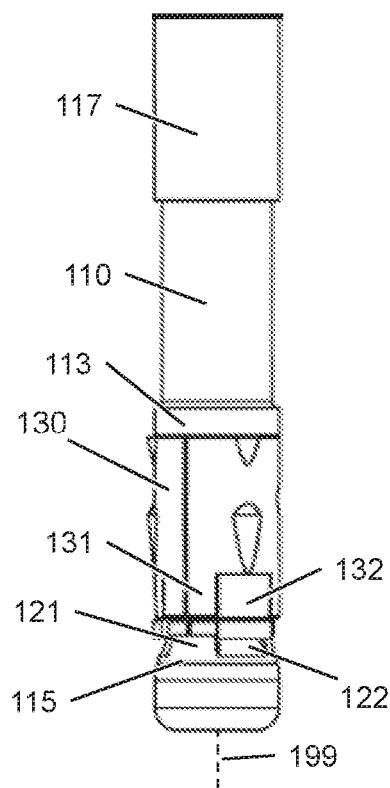
FIG. 5 is a side view of a second embodiment of an expansion anchor according to the invention.
Figure 6:
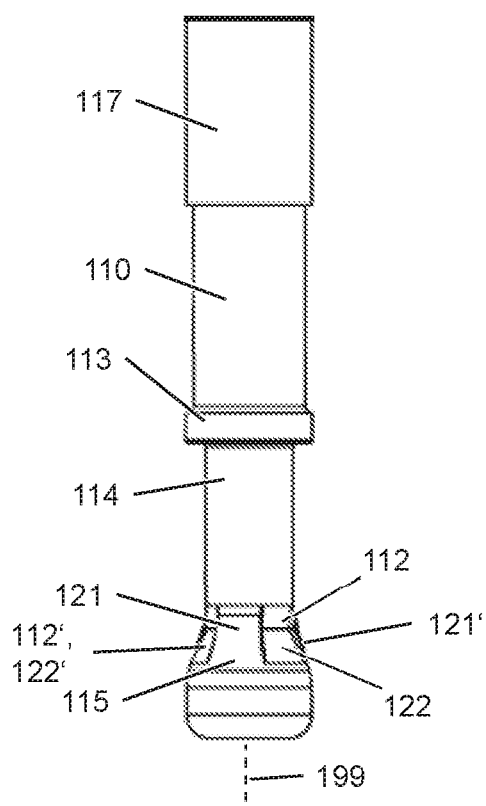
FIG. 6 is a side view of the anchor bolt of the expansion anchor from FIG. 5 without an expansion sleeve.

As shown in FIG. 3 in particular, the expansion sleeve 30 has a plurality of slits 42, 42' which extend axially backward into the expansion sleeve 30 starting from the front end face of the expansion sleeve 30 which faces the expansion body 15. The slits 42, 42' separate expansion tongues 31, 31' of the expansion sleeve 30 from one another. The expansion tongues 31, 31' are each free on the front side thereof and on the two opposite longitudinal sides thereof, and are interconnected on the respective rear sides thereof. The expansion tongues 31, 31' are thus free at the front and point axially forward, toward the expansion body 15.

As shown in particular in FIG. 3, an anchor tongue 32 is formed within the expansion tongue 31 by a U-shaped slit 44. Because of the U-shaped slit 44, the anchor tongue 32 is free on its rear side and on its two opposite longitudinal sides. The anchor tongue 32 is connected to the expansion tongue 31 on its front side. The anchor tongue 32 is thus free at the rear and points backward, away from the expansion body 15. The free end of the anchor tongue 32 is shifted axially backward relative to the free end of the expansion tongue 31.

In the present embodiment, the anchor tongue 32 is embedded all around in the expansion tongue 31, that is to say the anchor tongue 32 is embedded in the expansion tongue 31 on the front, rear and longitudinal sides. At its free end, which is the rear end here, the anchor tongue 32 has a radially outward-pointing claw 39, which is formed by bending the free end of the anchor tongue 32 radially outward.

Anchor tongues 32' which correspond to the anchor tongue 32 are also formed in the other expansion tongues 31'.

A cavity 12 is formed in the neck region 14 of the anchor bolt 10 and extends radially inward with respect to the longitudinal axis 99 of the anchor bolt 10. The anchor tongue 32 is partially received in this cavity 12. An anchor slope 22 for the anchor tongue 32 is formed at the front end of the cavity 12. The cross section of the anchor bolt 10 increases toward the front at this anchor slope 22. The anchor slope 22 can push the anchor tongue 32 radially outward when the anchor bolt 10 is shifted backward relative to the expansion sleeve 30 having the anchor tongue 32 and the anchor tongue 32 runs onto the anchor slope 22.

The anchor bolt 10 also has further cavities 12' for the further anchor tongues 32', which correspond to the cavity 12.

Expansion slopes 21, 21' for the expansion tongues 31, 31' are formed on the expansion body 15 and are arranged axially upstream of the expansion tongues 31, 31'. The cross section of the anchor bolt 10 increases toward the front at these expansion slopes 21, 21'. The expansion slopes 21, 21' can push the expansion tongues 31, 31' radially outward when the anchor bolt 10 is shifted backward relative to the expansion sleeve 30 having the expansion tongues 31, 31' and the expansion tongues 31, 31' run onto the expansion slopes 21 21'. The expansion slopes 21, 21' merge here and form a common, preferably conical, expansion slope.

The axial distance of the expansion tongues 31, 31' from the relevant expansion slope 21, 21' is smaller than the axial distance of the anchor tongues 32, 32' from the relevant anchor slope 22, 22', such that, when the anchor bolt 10 is shifted backward relative to the expansion sleeve 30, first the expansion tongues 31, 31' are pushed radially outward, followed by the anchor tongues 32, 32'. The anchor slopes 22, 22' are arranged more steeply with respect to the longitudinal axis 99 than the expansion slopes 21, 21', i.e., the anchor slopes 22, 22' form a greater maximum acute angle with the longitudinal axis 99 than the expansion slopes 21, 21'.

When the expansion anchor is mounted, the front end of the anchor bolt 10 is pushed into a borehole in the direction of the longitudinal axis 99 of the anchor bolt 10. Due to the sleeve stop 13, which blocks displacement of the expansion sleeve 30 toward the back end of the anchor bolt 10, the expansion sleeve 30 is also introduced into the borehole. The anchor bolt 10 is then pulled out of the borehole again to some extent, for example by tightening a nut that is arranged on the load application structure 17 formed as an external thread. Due to its friction with the borehole wall, the expansion sleeve 30 remains behind and there is backward axial displacement of the anchor bolt 10 relative to the expansion sleeve 30. In the course of this displacement, the expansion tongues 31, 31' first run onto their expansion slopes 21, 21' and are pushed radially outward by the slopes against the borehole wall. As the backward axial displacement of the anchor bolt 10 relative to the expansion sleeve 30 progresses, the anchor tongues 32, 32' also run onto their anchor slopes 22, 22' and are pushed radially outward by the slopes against the borehole wall. This mechanism secures the expansion anchor in the substrate.

FIGS. 5 to 8 show a second embodiment of an expansion anchor according to the invention. The expansion anchor has an anchor bolt 110 having a longitudinal axis 199, and an expansion sleeve 130, the expansion sleeve 130 annularly surrounding the anchor bolt 110. The anchor bolt 110 has a neck region 114 having an at least approximately constant cross section. Adjoining the neck region 114, the anchor bolt 110 has an expansion body 115 for the expansion sleeve 130 in front of the neck region 114, in the front end region of the anchor bolt 110, which expansion body is integral with the rest of the anchor bolt 110 here by way of example. On the expansion body 115, the anchor bolt 110 widens on its outer surface toward the front starting from the neck region 114, i.e., the expansion body 115 converges toward the rear on its outer side. The expansion sleeve 130 surrounds the neck region 114 of the anchor bolt 110. The expansion body 115 is largely arranged in front of the expansion sleeve 130.

The anchor bolt 110 also has a sleeve stop 113, for example in the form of a circular ring, which limits an axial movement of the expansion sleeve 130 toward the rear end of the anchor bolt 110, i.e., an axial movement of the expansion sleeve 130 away from the expansion body 115.

At its rear end region opposite the expansion body 115, the anchor bolt 110 has a load application structure 117, shown here, for example, as an external thread, for introducing tensile forces into the anchor bolt 110. A nut (not shown) with a corresponding internal thread can be arranged on this external thread.

Figure 7:
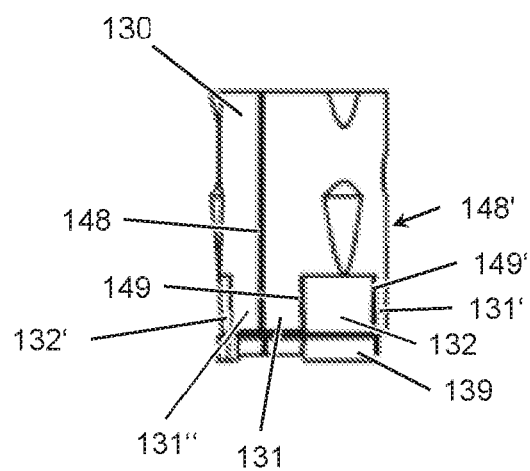
FIG. 7 is a side view of the expansion sleeve of the expansion anchor from FIG. 5.
Figure 8:
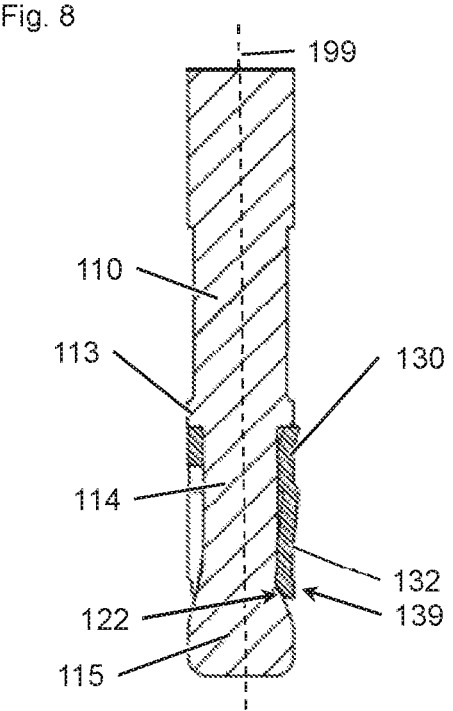
FIG. 8 is a longitudinal sectional view of the expansion anchor from FIG. 5.

As shown in particular in FIG. 7, the expansion sleeve 130 has a plurality of long slits 148, 148' and a plurality of short slits 149, 149'. Both the short slits 149, 149' and the long slits 148, 148' extend axially backward from the front end face of the expansion sleeve 130, which faces the expansion body 115, into the expansion sleeve 130 and, in so doing, the long slits 148, 148' extend further back than the short slits 149, 149'.

In the circumferential direction around the longitudinal axis 199, a long slit 148 is followed by two adjacent short slits 149, 149', followed by another long slit 148', then two adjacent short slits, and so on. In particular, the long slits 148, 148' and the short slits 149, 149' can extend in parallel with one another.

As shown in particular by FIG. 7, the expansion sleeve 130 has expansion tongues 131, 131', 131" and anchor tongues 132, 132' which are arranged at the front of the expansion sleeve 130. Both the expansion tongues 131, 131', 131" and the anchor tongues 132, 132' point axially forward. The free ends of the expansion tongues 131, 131', 131" and the free ends of the anchor tongues 132, 132' form the front end face of the expansion sleeve 130. In the present embodiment, the anchor tongues 132, 132' protrude a little further forward than the expansion tongues 131, 131', 131". However, a flush arrangement or an arrangement in which the expansion tongues 131, 131', 131" protrude further forward than the anchor tongues 132, 132' is also possible.

The anchor tongues 132, 132' are each formed and delimited by two adjacent short slits 149, 149'. The expansion tongues 131, 131, 131" are each formed and delimited by a long slit 148, 148' and a short slit 149, 149' adjacent to the long slit 148, 148'.

The expansion sleeve 130 has U-shaped structures, the legs of which are each formed by two expansion tongues 131, 131', 131", an anchor tongue 132, 132' being embedded in each of the U-shaped structures, between the two expansion tongues forming the legs.

The expansion tongues 131, 131' and the anchor tongues 132, 132' are free on their respective front and respective long sides and are interconnected on their respective rear sides.

At their free, i.e., front, ends, the anchor tongues 132, 132' each have a radially outward-pointing claw 139, which is formed by bending the free end of the anchor tongue 132, 132' radially outward.

Expansion slopes 121, 121' for the expansion tongues 131, 131' are formed on the expansion body 115 and are arranged axially upstream of the expansion tongues 131, 131'. The cross section of the anchor bolt 110 increases toward the front at these expansion slopes 121. The expansion slopes 121, 121' can push the expansion tongues 131, 131' radially outward when the anchor bolt 110 is shifted backward relative to the expansion sleeve 130 having the expansion tongues 131, 131' and the expansion tongues 131, 131' run onto the expansion slopes 121 121'. The expansion slopes 121, 121 here form portions of an envelope of a cone.

Cavities 112, 112' are formed in the expansion body 115 of the anchor bolt 110 and extend radially inward with respect to the longitudinal axis 199 of the anchor bolt 110. An anchor tongue 132, 132' is partially received in each of these cavities 112, 112'. An anchor slope 122, 122' is formed at each of the front ends of the cavities 112, 112' for the anchor tongue 132, 132' received in the relevant cavity 112, 112'. The cross section of the anchor bolt 110 increases toward the front at these anchor slopes 122, 122'. The anchor slopes 122, 122' can push the anchor tongue 132, 132' arranged in the associated cavity 112, 112' radially outward when the anchor bolt 110 is shifted backward relative to the expansion sleeve 130 having the anchor tongues 132, 132' and the anchor tongues 132, 132' run onto the anchor slopes 122, 122'.

The anchor slopes 122, 122' are arranged more steeply with respect to the longitudinal axis 199 than the expansion slopes 121, 121', i.e., the anchor slopes 122, 122' form a greater maximum acute angle with the longitudinal axis 199 of the anchor bolt 110 than the expansion slopes 121, 121'.

When the expansion anchor is mounted, the front end of the anchor bolt 110 is pushed into a borehole in the direction of the longitudinal axis 199 of the anchor bolt 110. Due to the sleeve stop 113, Which blocks displacement of the expansion sleeve 130 toward the back end of the anchor bolt 110, the expansion sleeve 130 is also introduced into the borehole. The anchor bolt 110 is then pulled out of the borehole again to some extent, for example by tightening a nut that is arranged on the load application structure 117 formed as an external thread. Due to its friction with the borehole wall, the expansion sleeve 130 remains behind and there is backward axial displacement of the anchor bolt 110 relative to the expansion sleeve 130. In the course of this displacement, the expansion tongues 131, 131' run onto their expansion slopes 121, 121' and are pushed radially outward by the slopes against the borehole wall, and the anchor tongues 132, 132' run onto their anchor slopes 122, 122' and are pushed radially outward by the slopes against the borehole wall. This mechanism secures the expansion anchor in the substrate.

The invention claimed is:

1. An expansion anchor, comprising:
   an anchor bolt; and
   an expansion sleeve, wherein the expansion sleeve surrounds the anchor bolt;
   wherein the expansion sleeve has an expansion tongue and an anchor tongue;
   wherein the anchor bolt has a backward-pointing expansion slope and wherein the expansion tongue is radially displaceable by the backward-pointing expansion slope;
   wherein the anchor bolt has a backward-pointing anchor slope and wherein the anchor tongue is radially displaceable by the backward-pointing anchor slope;
   wherein the backward-pointing anchor slope extends more steeply than the backward-pointing expansion slope at least in a region;
   wherein a cavity is formed in the anchor bolt, wherein the backward-pointing anchor slope is formed at a front end of the cavity, wherein the anchor tongue is partially received in the cavity, and wherein a radially outward-pointing claw is disposed at a free end of the anchor tongue.

2. The expansion anchor according to claim 1, wherein when the expansion tongue is axially displaced toward the backward-pointing expansion slope the expansion tongue runs onto the backward-pointing expansion slope before the anchor tongue runs onto the backward-pointing anchor slope.

3. The expansion anchor according to claim 1, wherein the backward-pointing anchor slope completely covers the free end of the anchor tongue with regard to a circumferential direction of the anchor bolt.

4. The expansion anchor according to claim 1, wherein both the expansion tongue and the anchor tongue point forward.

5. The expansion anchor according to claim 4, wherein both the expansion tongue and the anchor tongue protrude from a front of the expansion sleeve.

6. The expansion anchor according to claim 5, wherein the expansion tongue and the anchor tongue protrude forward to a respective extent that differ from one another.

7. The expansion anchor according to claim 1, wherein the expansion tongue and the anchor tongue point in opposite directions from one another.

8. The expansion anchor according to claim 7, wherein the expansion tongue points forward and the anchor tongue points backward.

9. The expansion anchor according to claim 1, wherein the anchor tongue is embedded around all sides thereof in the expansion tongue.

10. The expansion anchor according to claim 1, wherein the backward-pointing anchor slope and the backward-pointing expansion slope overlap axially.

11. The expansion anchor according to claim 1, wherein the backward-pointing anchor slope and the backward-pointing expansion slope are disposed axially shifted with respect to one another.

12. The expansion anchor according to claim 1, wherein the anchor bolt has an expansion body and wherein the backward-pointing expansion slope is formed on the expansion body.

13. The expansion anchor according to claim 1, wherein the expansion sleeve has a plurality of expansion tongues and a plurality of anchor tongues and wherein the anchor bolt has a plurality of backward-pointing expansion slopes and a plurality of backward-pointing anchor slopes.

14. A method of using the expansion anchor according to claim 1, comprising the steps of:
   displacing the anchor bolt relative to the expansion sleeve and, by the displacing, radially displacing the expansion tongue by the backward-pointing expansion slope and radially displacing the anchor tongue by the backward-pointing anchor slope.

* * * * *